(12) United States Patent
Reddy

(10) Patent No.: US 6,500,241 B2
(45) Date of Patent: Dec. 31, 2002

(54) HYDROGEN AND CARBON DIOXIDE COPRODUCTION

(75) Inventor: Satish Reddy, Irvine, CA (US)

(73) Assignee: Fluor Corporation, Aliso Viejo, CA (US)

( * ) Notice: Subject to any disclaimer, the term of this patent is extended or adjusted under 35 U.S.C. 154(b) by 66 days.

(21) Appl. No.: 09/741,649

(22) Filed: Dec. 19, 2000

(65) Prior Publication Data

US 2002/0073845 A1 Jun. 20, 2002

(51) Int. Cl.$^7$ .......................... B01D 53/04; B01D 53/14
(52) U.S. Cl. ...................... 96/134; 96/142; 96/243; 62/617
(58) Field of Search .................... 95/41, 42, 92–94, 95/96–98, 100–105, 116, 139, 236; 96/108, 134, 136; 142, 243

(56) References Cited

U.S. PATENT DOCUMENTS

| | | | | |
|---|---|---|---|---|
| 3,011,589 A | * | 12/1961 | Meyer | 95/41 |
| 3,420,633 A | * | 1/1969 | Lee | 95/236 X |
| 3,699,218 A | * | 10/1972 | Smith et al. | 95/92 X |
| 3,838,553 A | * | 10/1974 | Doherty | 95/98 |
| 4,077,779 A | * | 3/1978 | Sircar et al. | 95/101 X |
| 4,333,744 A | * | 6/1982 | Fuderer | 95/236 X |
| 4,687,498 A | * | 8/1987 | Maclean et al. | 95/98 X |
| 4,732,596 A | * | 3/1988 | Nicholas et al. | 95/98 X |
| 4,761,167 A | * | 8/1988 | Nicholas et al. | 95/98 X |
| 4,861,351 A | * | 8/1989 | Nickolas et al. | 95/236 X |
| 4,963,339 A | * | 10/1990 | Krishnamurthy et al. | 95/139 X |
| 4,977,745 A | * | 12/1990 | Heichberger | 95/42 X |
| 4,982,050 A | * | 1/1991 | Gammie et al. | 95/92 X |
| 5,096,470 A | * | 3/1992 | Krishnamurthy | 95/102 |
| 5,112,590 A | * | 5/1992 | Krishnamurhty et al. | 95/102 X |
| 5,318,758 A | * | 6/1994 | Fujii et al. | 95/236 X |
| 5,435,836 A | * | 7/1995 | Anand et al. | 95/139 X |
| 5,486,227 A | * | 1/1996 | Kumar et al. | 95/101 X |
| 5,669,960 A | * | 9/1997 | Couche | 95/139 X |
| 5,980,857 A | * | 11/1999 | Kapoor et al. | 95/139 X |
| 6,322,611 B1 | * | 11/2001 | Engler | 95/139 X |

* cited by examiner

Primary Examiner—Robert H. Spitzer
(74) Attorney, Agent, or Firm—Rutan & Tucker, LLP

(57) ABSTRACT

A gas production plant has a first separator receiving a feed gas and produces a first offgas stream and a first product stream, and a second separator receives the first offgas stream and produces a second product stream and a second offgas stream. A liquefaction unit receives at least part of the first product stream and at least part of the second offgas stream, and produces a third product stream and a third offgas stream. A first portion of the third offgas stream is combined with the first offgas stream, and a second portion of the third offgas stream is used as a non-waste gas. In a method of removing a first and a second gaseous component from a feed gas, a PSA unit produces a first product stream and a first offgas stream. The first offgas stream is fed into a liquefaction unit that produces a second product stream and a second offgas stream, and at least part of the second offgas stream is recycled into the PSA unit.

13 Claims, 2 Drawing Sheets

HYDROGEN AND CARBON DIOXIDE COPRODUCTION

FIELD OF THE INVENTION

The field of the invention is concurrent hydrogen and carbon dioxide production.

BACKGROUND OF THE INVENTION

Complex mixtures of gases such as refinery gases or offgases from combustion processes are frequently employed as starting materials in the production of purified gases, and various systems have been developed to concurrently isolate at least 2 or more gases at a relatively high purity (i.e., greater than 90% (v/v) from a single gas mixture.

Some systems employ a serial configuration of PSA units, wherein a first PSA unit has a different selectivity from a second PSA unit, and wherein the offgas from the first unit is directed to the feed end of the second PSA unit. An example for this configuration is described by R. Kumar in U.S. Pat. No. 4,913,709. Kumar's serial configuration of PSA units with beds having non-identical adsorption specificity is favorable in cases where relatively high volumes of offgas are to be purified 1 at a time. However, the complexity and number of coordinated cycle steps generally increases due to the different physico-chemical properties of the adsorbent beds, thereby adversely increasing cost and maintenance requirements.

Other systems utilize configurations with a PSA unit and a non-PSA unit as for example described in U.S. Pat. No. 4,553,981 to Fuderer. In Fuderer's system, carbon dioxide is removed as a waste gas from a feed gas stream by a $CO_2$ scrubber, and the $CO_2$-depleted stream is subsequently fed into a $H_2$-PSA unit. The $H_2$-PSA offgas is then vented via a waste line into the atmosphere, or recycled to a converter or shift unit. While concurrently separating $H_2$ and $CO_2$ from the feed gas, Fuderer's configuration advantageously may be employed to reduce undesirable build-up of nitrogen and/or argon in the waste gases from the scrubber and $H_2$-PSA unit by recycling the waste gases to the reformer of shift converter. However, considerable amounts of carbon dioxide and hydrogen remain in the recycling circuit and are typically vented or combusted, rendering them no more amenable to recovery.

Still other systems employ selective membranes to separate a desirable gaseous component from the offgas of a PSA unit. For example, G. Intille describes in U.S. Pat. No. 4,229,188 the use of hydrogen permeable membranes to recover $H_2$ from the offgas of a PSA unit. Intille's membranes advantageously remove $H_2$ with high selectivity in a single process step, however, the use of such membranes generally requires relatively high pressure, thereby increasing the overall energy demand. To avoid at least some of the problems associated with hydrogen-permeable membranes, Anand et al. teach in U.S. Pat. No. 5,435,836 the use of an adsorbent membrane. Adsorbent membranes typically allow hydrogen recovery at comparably low pressure with relatively high specificity. The advantage of relatively low pressure, however, tends to be offset by the need of membrane exchange, thereby either increasing the complexity of the hydrogen. plant, or necessitating discontinuous operation.

Thus, although various systems for concurrent production of desirable gases from gas mixtures are known in the art, all or almost all of them suffer from one or more than one disadvantage. Therefore, there is a need to provide improved methods and apparatus for concurrent production of desirable gases from gas mixtures.

SUMMARY OF THE INVENTION

The present invention is directed to a gas production plant comprising a gas source, a first and second separator, and a liquefying unit. The first separator receives feed gas from the gas source and produces a first offgas stream and a first product stream, whereas the second separator receives the first offgas stream to produce a second offgas stream and a second product stream. The liquefaction unit receives the first product stream and the second offgas stream thereby producing a liquefied third product stream and a third offgas stream, and at least part of the third offgas stream is combined with the first offgas stream.

In one aspect of the inventive subject matter, the gas source provides a feed gas predominantly comprising hydrogen and carbon dioxide, which is produced from natural gas via a steam reformer process. While the first separator preferably comprises a $CO_2$ scrubber, the second separator comprises a hydrogen pressure swing adsorption (PSA) unit, and the liquefaction unit comprises in a particularly preferred aspect an autorefrigeration unit.

In another aspect of the inventive subject matter, a method of removing a first gaseous component and a second gaseous component from a feed gas employs a PSA unit that produces a first product stream predominantly comprising the second gaseous component, and a first offgas stream predominantly comprising the first gaseous component and the second gaseous component. At least part of the offgas stream is fed into a liquefaction unit that produces a second product stream and a second offgas stream, and at least part of the second offgas stream is recycled into the PSA unit.

Various objects, features, aspects and advantages of the present invention will become more apparent from the following detailed description of preferred embodiments of the invention, along with the accompanying drawing. dr

DETAILED DESCRIPTION

As used herein, the term "non-waste gas" refers to a gas that is used in a process other than venting into the atmosphere, and preferred processes include combustion in a steam reformer or gas turbine, expansion or compression, and heating/cooling in a heat exchange device.

As also used herein, the term "autorefrigeration system" refers to a device that produces high purity liquid $CO_2$ using $CO_2$ as a refrigerant. An especially contemplated autorefrigeration system is described in PCT application PCT/US99/00087 to S. Reddy, incorporated herein by reference.

As further used herein the terms "$H_2$ PSA unit" and "hydrogen PSA unit" both refer to a PSA unit that is configured to produce a product gas stream predominantly comprising hydrogen.

Similarly, a "$CO_2$ PSA unit" and a "carbon dioxide PSA unit" refer to a PSA unit that is configured to produce a product gas stream predominantly comprising carbon dioxide, wherein the term "predominantly comprising" means that the product gas stream comprises at least 50% of the carbon dioxide, hydrogen, or other compound that is predominantly present in a product.

Figure 1:
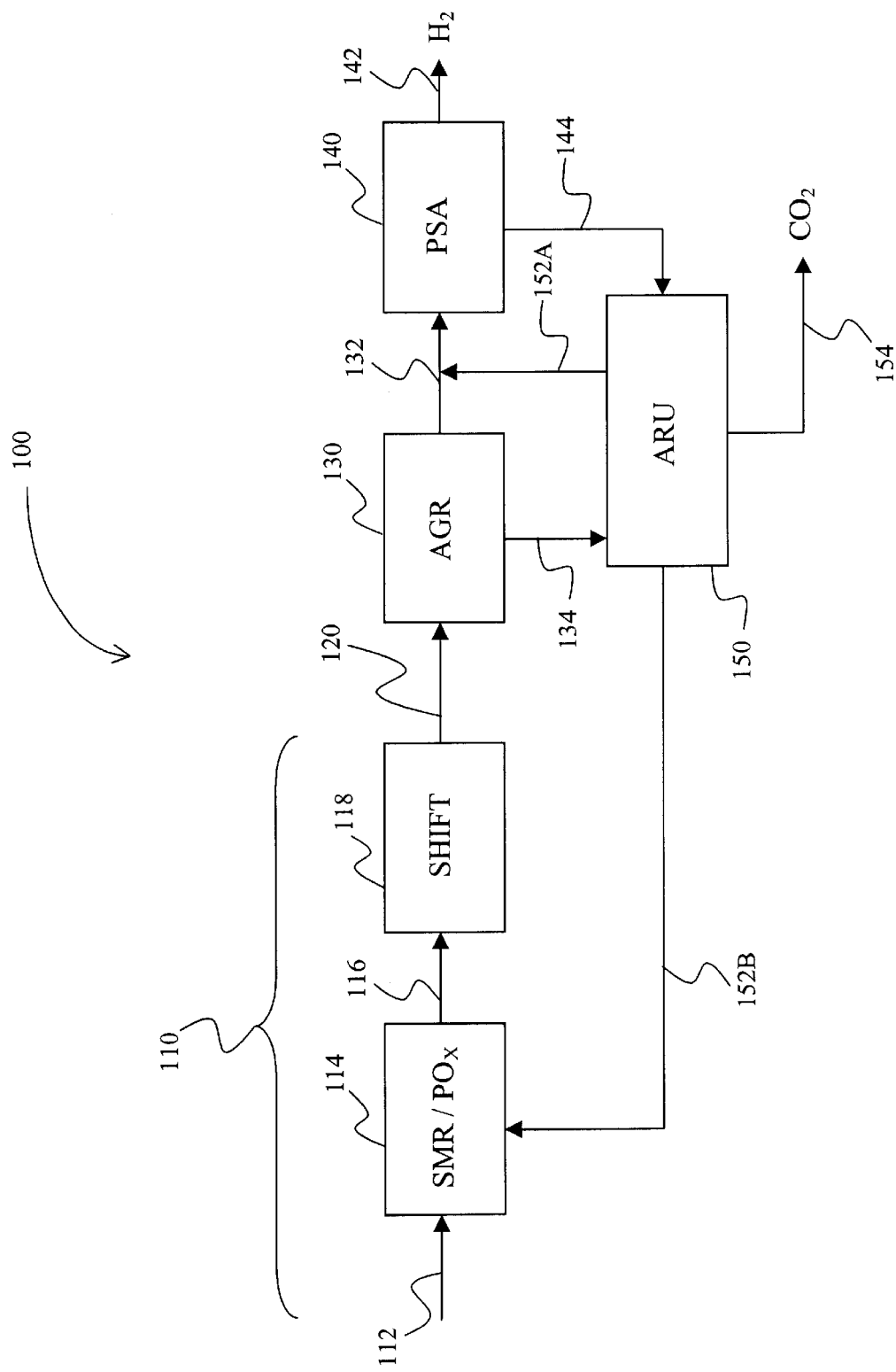
FIG. 1 is a schematic of a gas production plant according to the inventive subject matter.

In FIG. 1, a plant 100 generally has a gas source 110, in which a stream of source gas 112 is reformed in a reformer 114, and transferred via transfer line 116 to converter 118, in which the reformed source gas is converted to yield feed gas stream 120. A first separator 130 removes a first gaseous component from the feed gas to produce a first product stream 134 and a first offgas stream 132. The first offgas stream 132 is fed into a second separator 140 to produce a second product stream 142 and a second offgas stream 144. Both second offgas stream 144 and first product stream 134 arc fed into liquefaction unit 150, and third product stream 154 removes liquefied product from the liquefaction unit. A first portion 152A of a third offgas stream leaving the liquefaction unit is combined with the first offgas stream 132, and a second portion 152B of the third offgas stream is combusted in the reformer burner.

In a preferred aspect of the inventive subject matter, the production plant is a plant for hydrogen and carbon dioxide coproduction, wherein the first gaseous component is carbon dioxide and the second gaseous component is hydrogen. The gas source comprises a steam reformer and a shift converter to convert a stream of natural gas predominantly comprising $CH_4$ into a feed gas stream predominantly comprising $CO_2$ and $H_2$. The first separator is a $CO_2$ scrubber in combination with a flash unit and separation tank that removes a first portion of $CO_2$ from the feed gas, thereby producing a first product stream with a $CO_2$ concentration of greater than 80 mol %, and a first offgas stream, which is fed into a hydrogen PSA unit. The second separator is a hydrogen PSA unit that produces a second product stream containing $H_2$ with a purity of greater than 99 mol %, and a second offgas stream containing about 20 mol % $H_2$ and greater than 70 mol % $CO_2$. Both the first product stream 134 and the second offgas stream 144 are fed into autorefrigeration unit 150, which produces a third product stream 154 containing CO2 with a purity of greater than 98 mol %. Approximately 70% (by vol.) of the third offgas stream (i.e., first portion of the third offgas stream) is admixed to the first offgas stream, while about 30% (by vol.) is transferred to the steam reformer burner (i.e., second portion of the third offgas stream).

With respect to the configuration of the liquefaction unit, it should be especially appreciated that increased rates of $CO_2$ and $H_2$ recovery are achieved by (a) feeding the $H_2$-PSA offgas to the autorefrigeration unit-and (b) concurrent recycling of the autorefrigeration unit offgas into the $H_2$-PSA. For example, $CO_2$ that has not been removed from the feed gas stream in the first separator will be fed together with $H_2$ into the autorefrigeration unit via the second offgas stream from the $H_2$-PSA unit. The $CO_2$ in the second offgas stream is cryogenically recovered from the second offgas stream in the autorefrigeration unit, rendering the autorefrigeration unit a secondary separator. The $H_2$ in the second offgas stream passes through the autorefrigeration unit, and by re-feeding at least part of the third offgas stream to the $H_2$-PSA, $H_2$ from the second offgas stream is recycled to and subsequently recovered by the $H_2$-PSA unit.

It should also be appreciated that in alternative aspects of the inventive subject matter, the gas source need not be limited to a gas source comprising a steam reformer and a shift converter, but may include various other components, the choice of which mainly depends on the desired gas. For example, where hydrogen production is particularly desired appropriate gas sources may employ components for partial oxidation of various hydrocarbons, or coal gasification. On the other hand, the gas source need not be restricted to a source producing predominantly hydrogen, and may include sources producing $N_2$, $CO_2$, CO, He, Ar, etc. It is still further contemplated that, where relatively pure gases are side products of an industrial process, appropriate gas sources may also comprise elements that are employed in gas purification rather than production, such as PSA units, absorber units, distillation columns, acid gas removal units, etc.

Consequently, the feed gas stream need not be restricted to a gas mixture predominantly comprising $H_2$, and $CO_2$. Alternative feed gas streams are contemplated to include gas mixtures comprising $C_2$–$C_6$ hydrocarbons, and higher, which may or may not be aliphatic, inert gases such as $N_2$, He, Ar, or pre-treated gas mixtures that have been enriched with, or depleted of one or more compounds. For example, contemplated feed gas streams may comprise an effluent gas from a steam reforming process, a partial oxidation process, a stripping process, a combustion, or a coal gasification process.

With respect to the first separator it is preferred that appropriate first separators include an acid gas removal unit, and particularly contemplated acid gas removal units employ a solvent that removes at least part of the first gaseous component. Depending on the particular gaseous component and configuration of the separator, the solvent may include physical and chemical solvents, and preferred solvents are monoethanolamnine, activated methyldiethanolamine, propylene glycol and glycol dimethylether. Although preferred first separators include a $CO_2$ scrubber in combination with a flash unit and separation tank, various alternative separators are also conteriplated. For example, where relatively small volumes of feed gases are processed, alternative first se parators may include selective membranes. In other cases, where the feed gas is derived from a cryogenic process, a distillation apparatus may be utilized as the first separator, and for processes where recovery of a gaseous component in high purity (e.g., greater 99% (v/v)) is desired, a pressure swing adsorption unit may be employed as a first separator. Similarly, the second separator need not be limited to a hydrogen PSA ,unit, and alternative second separators may include a $CO_2$-PSA unit, a selective membrane, a distillation apparatus, etc., so long as alternative second separators are fluidly coupled to a first separator and receive at least part of the first offgas stream.

Although preferred liquefaction unit is a carbon dioxide autorefrigeration unit, contemplated alternative liquefaction units also include liquefaction units with processes requiring an external refrigerant such as ammonia, fluorohydrocarbons, or fluorochlorohydrocarbons. The liquefied $CO_2$ obtained from the autorefrigeration unit preferably has a purity of greater than 98% (v/v), more preferably greater than 99% (v/v), and most preferably greater than 99.9% (v/v). With respect to the amount/fraction of the third offgas stream that is admixed to the first offgas stream, it is contemplated that while about 70% (by vol.) are preferable, many other amounts/fractions are also appropriate so long as at least part of the third offgas stream is recycled to the second separator. Generally conteplated amounts/fractions range between 0.1% and 100%, and more preferred amounts/fractions are between 40% and 80%. For example, where the third offgas stream comprises only minor quantities of hydrogen, and the second separator is a $H_2$-PSA unit, amounts of about 5–25% may be recycled to the first offgas stream. On the other hand, during normal operation of a $H_2$-PSA unit the second offgas stream will contain about 20% (v/v) hydrogen, which may almost be completely recovered by recycling 70–90%.(v/v) or more of the third offgas stream to the first offgas stream. Still further, it should be appreciated that admixing of the first portion of the third offgas stream to the first offgas stream may be a continuous process or a discontinuous process. For example, in some cases 80% of the third offgas stream may continuously be admixed to the first offgas stream, while in other cases 100% of the third offgas stream may be admixed to the first offgas stream for 50s in a 60s interval.

Likewise, the amount/fraction of the second portion of the third offgas stream may be different from preferred amount/fraction, and typically depends on the amount/fraction of the first portion of the third offgas stream. With respect to the use of the second portion of the third offgas stream, it is contemplated that various uses other than combustion in a steam reformer burner are also appropriate, so long as the second portion of the third offgas stream is utilized as a non-waste gas. For example, where the second portion of the third offgas stream has a relatively low temperature, the second portion could be employed as a coolant, or where the amount of combustible components (e.g., methane) is relatively high, the second portion may be combusted in a gas turbine. It should be especially appreciated that due to the configuration of the first and second separator in cooperation with the liquefaction unit, the concentration of the first and second gaseous components are preferably below 10% (v/v), more preferably below 1% (v/v), and most preferably below 0.1% (v/v).

Figure 2:
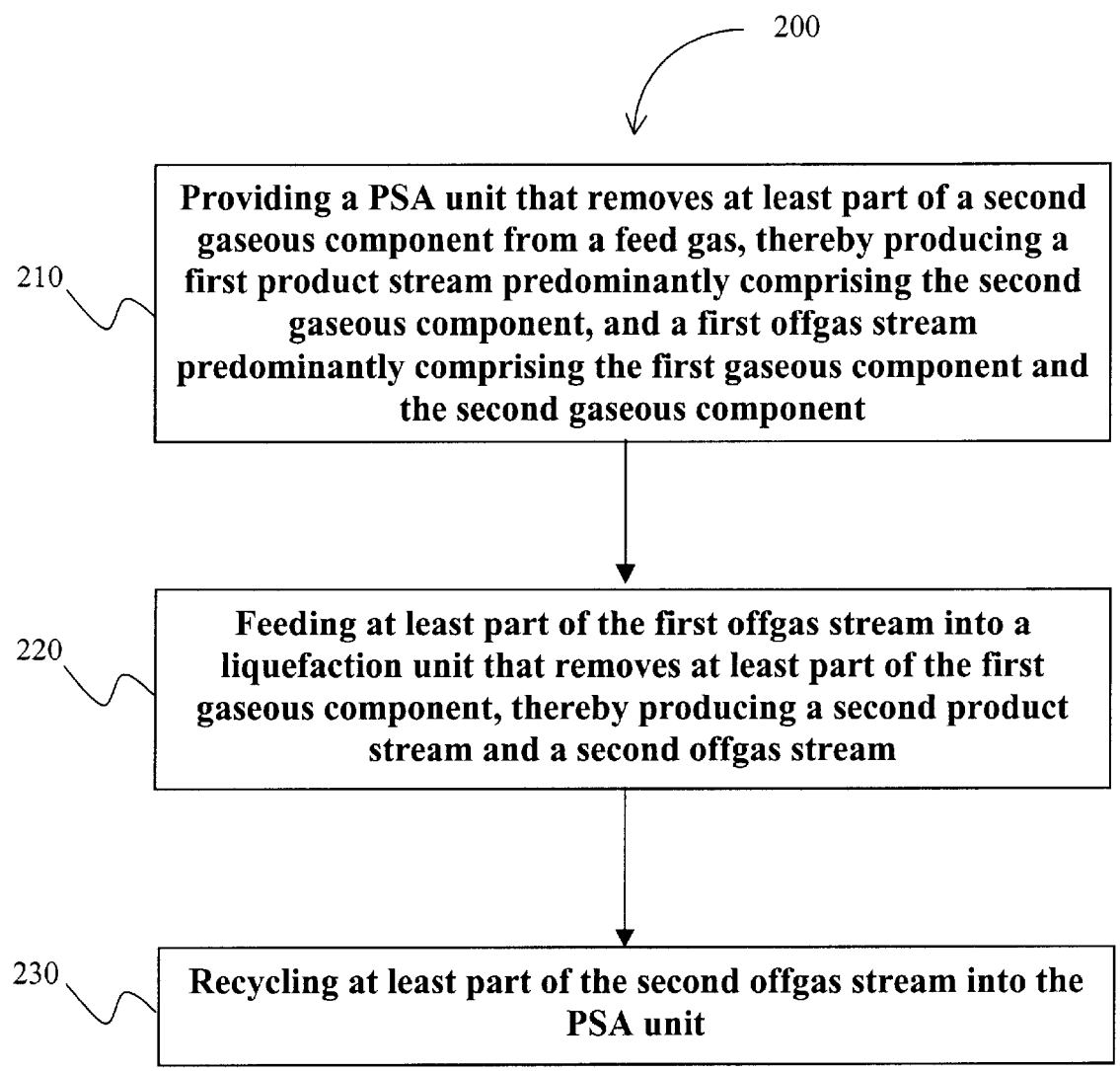
FIG. 2 is a flow diagram depicting a method of increasing recovery of a gaseous component from a feed gas according to the inventive subject matter.

In FIG. 2, a general method 200 of removing a first and a second gaseous component from a feed gas has a step 210 in which a PSA unit is provided that removes at least part of the second gaseous component from the feed gas, thereby producing a first product stream predominantly comprising the second gaseous component, and a first offgas stream predominantly comprising the first gaseous component and the second gaseous component. In a further step 220, at least part of the first offgas stream is fed into a liquefaction unit that removes at least part of the first gaseous component, thereby producing a second product stream and a second offgas stream, and in a still further step 230, at least part of the second offgas stream is recycled into the PSA unit.

In a preferred aspect of the inventive subject matter, the first and second gaseous components are carbon dioxide and hydrogen, respectively, and the feed gas (predominantly comprising $H_2$ and $CO_2$) is obtained from natural gas via steam reforming and processing in a shift converter. The PSA unit is a $H_2$-PSA unit that produces a first product stream predominantly comprising $H_2$, and an offgas stream predominantly comprising $H_2$ and $CO_2$. The PSA offgas is fed into a carbon dioxide autorefrigeration unit, which removes $CO_2$ from the offgas by liquefaction, thereby producing a liquefied carbon dioxide product stream. About 70% (v/v) of the $CO_2$-depleted offgas from the autorefrigeration unit is recycled into the feed end of the PSA unit.

It should be especially appreciated that the method according to the inventive subject matter confers various advantages to a method of removing a first and second gaseous component from a feed gas. For example, by feeding the offgas from a: $H_2$-PSA unit into a carbon dioxide autorefrigeration unit, remaining carbon dioxide from the feed gas is effectively recovered. Furthermore, the immediate recycling of at least part of the offgas from the autorefrigeration unit to the $H_2$-PSA unit significantly reduces loss of hydrogen as waste gas. Thus, contemplated methods effectively increase the recovery of first and second gaseous component from a feed gas.

With respect to corresponding elements between method 200 and gas production plant 100, the same considerations apply for elements in method 200 as discussed in plant 100 (vide supra).

Thus, specific embodiments and applications of methods and apparatus for improved concurrent hydrogen and carbon dioxide production have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A gas production plant comprising:
    a gas source providing a feed gas stream having a first gaseous component and a second gaseous component;
    a first separator fluidly coupled to the gas source, wherein the first separator removes at least part of the first gaseous component from the feed gas stream, thereby producing a first offgas stream and a first product stream predominantly comprising the first gaseous component;
    a second separator fluidly coupled to the first separator, wherein the second separator removes at least part of the second gaseous component from the first offgas stream, thereby producing a second offgas stream and a second product stream predominantly comprising the second gaseous component;
    a liquefaction unit fluidly coupled to the first and second separator, wherein the liquefaction unit receives at least part of the first product stream and at least part of the second offgas stream to produce a third product stream predominantly comprising liquefied first gaseous component; and
    wherein the liquefaction unit produces a third offgas stream of which a first portion is combined with the first offgas stream, and of which a second portion is used as a non-waste gas.

2. The production plant of claim 1 wherein the feed gas stream comprises an effluent gas from a steam reforming process.

3. The production plant of claim 1 wherein the feed gas stream comprises an effluent gas from one of a partial oxidation process and a coal gasification process.

4. The production plant of claim 1 wherein the first gaseous component is carbon dioxide.

5. The production plant of claim 1 wherein the second gaseous component is hydrogen.

6. The production plant of claim 1 wherein the first separator comprises an acid gas removal unit.

7. The production plant of claim 6 wherein the acid gas removal unit utilizes a solvent that removes at least part of the first gaseous component.

8. The production plant of claim 7 wherein the solvent is selected from the group consisting of a monoethanolamine, an activated methyl-diethanolamine, a propylene glycol, and a glycol dimethylether.

9. The production plant of claim 1 wherein the second separator comprises a pressure swing adsorption unit.

10. The production plant of claim 9 wherein the pressure swing adsorption unit is a hydrogen pressure swing adsorption unit.

11. The production plant of claim 1 wherein the liquefaction unit comprises a carbon dioxide autorefrigeration unit.

12. The production plant of claim 1 wherein the use of the second portion of the third offgas stream as a non-waste gas comprises combustion in a reformer burner.

13. The production plant of claim 1 wherein the use of the second portion of the third offgas stream as a non-waste gas comprises combustion in a gas turbine.

* * * * *